US006974949B2

(12) United States Patent
Orrico et al.

(10) Patent No.: US 6,974,949 B2
(45) Date of Patent: Dec. 13, 2005

(54) POSITION SENSOR WITH AN OPTICAL MEMBER OF VARYING THICKNESS

(75) Inventors: Mario M. Orrico, Chicago, IL (US); Richard P. Bolger, Schaumburg, IL (US); Leslie M. Watts, Tiger, GA (US)

(73) Assignee: Illinois Tool Works Inc., Glenview, IL (US)

( * ) Notice: Subject to any disclaimer, the term of this patent is extended or adjusted under 35 U.S.C. 154(b) by 104 days.

(21) Appl. No.: 10/739,883

(22) Filed: Dec. 18, 2003

(65) Prior Publication Data
US 2005/0133696 A1 Jun. 23, 2005

(51) Int. Cl.[7] .......................... G01D 5/34; H01J 40/14
(52) U.S. Cl. .......................... 250/231.13; 250/214 PR; 356/614
(58) Field of Search ..................... 250/231.13–231.18, 250/237 G, 205, 214 PR, 237 R; 341/13, 341/11, 31; 200/61.27; 356/614, 616–617

(56) References Cited

U.S. PATENT DOCUMENTS

| | | | |
|---|---|---|---|
| 3,258,601 A | 6/1966 | Suleski | |
| 3,859,617 A | 1/1975 | Oka et al. ...................... 338/15 |
| 4,103,155 A | 7/1978 | Clark | |
| 4,250,380 A * | 2/1981 | Iyeta ..................... 250/231.13 |
| 4,276,534 A | 6/1981 | Meyer et al. ................. 338/15 |
| 4,284,885 A | 8/1981 | Swensen ................. 250/211 K |
| 4,523,090 A | 6/1985 | Wagner ................... 250/211 K |
| 4,554,451 A | 11/1985 | Kirstein ................... 250/237 G |
| 4,712,000 A * | 12/1987 | Yoshikawa et al. ......... 250/205 |
| 4,796,000 A | 1/1989 | Mondl .......................... 338/15 |
| 4,859,845 A | 8/1989 | Sakano ................. 250/231 SE |
| 4,878,722 A | 11/1989 | Nelson et al. ............. 350/96.2 |
| 4,880,969 A | 11/1989 | Lawrie ........................ 250/221 |
| 5,017,771 A | 5/1991 | Bartholomew et al. | |
| 5,251,068 A | 10/1993 | Oshima et al. ............. 359/634 |
| 5,313,069 A * | 5/1994 | Tham ..................... 250/559.26 |
| 5,376,785 A | 12/1994 | Chin et al. ............. 250/214 PR |
| 6,015,970 A * | 1/2000 | Guzik et al. ................. 250/229 |
| 6,025,588 A | 2/2000 | Hsu ..................... 250/214 PR |
| 6,617,958 B1 | 9/2003 | Hwan ......................... 338/196 |

FOREIGN PATENT DOCUMENTS

| | | |
|---|---|---|
| DE | 33 07 639 A1 | 9/1984 |
| DE | 195 28 704 A1 | 2/1997 |
| EP | 0 062 192 A | 10/1982 |
| EP | 0 663 066 B1 | 8/1993 |
| JP | 3-202714 | 12/1989 |
| WO | WO 94/08208 | 9/1993 |

\* cited by examiner

*Primary Examiner*—David Porta
*Assistant Examiner*—Suezu Ellis
(74) *Attorney, Agent, or Firm*—Mark W. Croll; Paul F. Donovan

(57) ABSTRACT

A position sensor device that produces a variable output voltage when using a light emitting diode, such as an infrared light emitting diode (IR-LED), and a phototransistor further includes the use of a semi-transparent piece of material having a varying thickness that passes between the IR-LED and the phototransistor. The output voltage provided by the phototransistor varies depending on the amount of light collected by the phototransistor, which is controlled by the amount of light passing through the semi-transparent material. The amount of light passing through the transparent material depends on the thickness of the semi-transparent material. With the invention, the semi-transparent material may pass between the IR-LED and phototransistor in either a linear or rotary manner.

22 Claims, 4 Drawing Sheets

POSITION SENSOR WITH AN OPTICAL MEMBER OF VARYING THICKNESS

FIELD OF THE INVENTION

The present invention relates generally to sensor devices, and more particularly to a position sensor device for a controller, the sensor device using a light emitting diode that transmits light, such as infrared light, through a movable semi-transparent material, which is coupled to the controller, and using a phototransistor that receives the transmitted light and produces a variable output voltage that is indicative of the position of the semi-transparent material and the controller.

BACKGROUND OF THE INVENTION

Position sensor devices are well known. For example, it is known to use a position sensor device to detect the movement and location of a control device, such as a controller, joystick control, vehicle throttle control, and an accelerator device, to name a few. The known position sensor devices detect the movement and position of the control device and translate that movement and position into a control signal that may be further processed and used to control the movement of a vehicle, equipment, or the like. The known position sensor devices, however, have several drawbacks. As an example, the known position sensor devices are complex, often difficult to manufacture, require a considerable amount of time to assemble, and generally have an overall high cost application. In addition to these drawbacks, other drawbacks exist with respect to existing sensor devices that are overcome by the present invention.

SUMMARY OF THE INVENTION

The present invention is directed to a linear and rotary position sensor device that detects the position of a controller accurately through the use of a light emitting diode, a phototransistor, a semi-transparent material that passes between the light emitting diode and the phototransistor, and electronic circuitry. According to the invention, movement of the controller causes movement of the semi-transparent material between the light emitting diode and the phototransistor. The movement and position of the semi-transparent material, in turn, controls the amount of light transmitting between the light emitting diode and the phototransistor and, consequently, controls the amount of light collected by the phototransistor. As the amount of light collected by the phototransistor varies, so does the output voltage provided by the phototransistor to the electrically coupled electronic circuitry. Based on the varying output voltage of the phototransistor, and through the use of the associated electronic circuitry, a position sensor that accurately detects the position of the controller is achieved by the invention. Advantageously, the position sensor of the invention is easier to manufacture and assemble over known position sensors, and has an overall lower cost application.

Other features and advantages of the invention will become apparent to those skilled in the art upon review of the following detailed description, claims and drawings in which like numerals are used to designate like features.

Figure 1:
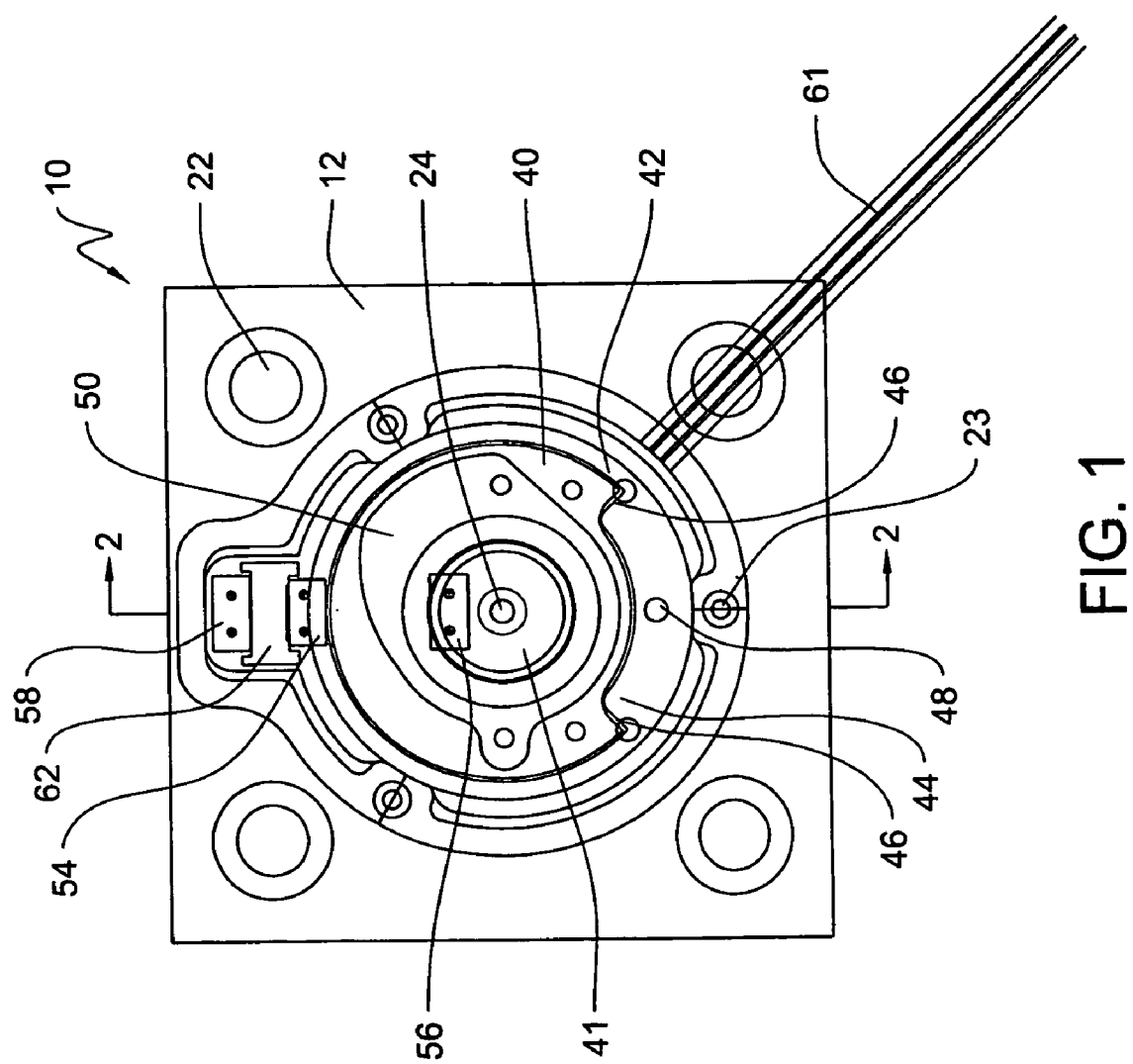
FIG. 1 is a plan view of an exemplary sensor of the invention, with the housing cover removed to illustrate the internal sensor components.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

The present invention is directed to a sensor device that senses the position of a controller accurately using electronic circuitry. Preferably, the electronic circuitry is analog electronic circuitry. In a general sense, the sensor device of the invention achieves this accurate sensing through the use of a light emitting diode, a phototransistor, and a semi-transparent material—variations of which are depicted in the various exemplary embodiments. In one embodiment, the light emitting diode is an infrared light emitting diode (IR-LED). Although the invention will be further described in regards to an IR-LED, it is to be understood that other light emitting diodes may be suitable for use according to the principles of the present invention. The semi-transparent material is coupled to the controller and is arranged to pass between the IR-LED and the phototransistor. When infrared light from the IR-LED falls on the phototransistor, the light is collected by the phototransistor, which becomes conductive, thereby providing an output voltage. The amount of conductivity is proportional to the amount of light collected by the phototransistor. The amount of collected light and thus the amount of output voltage is controlled by passing the semi-transparent material between the IR-LED and the phototransistor.

According the invention, the semi-transparent material has a varying thickness and may pass between the IR-LED and phototransistor in either a linear or rotary manner. The amount of light collected by the phototransistor is a function of the opacity of the semi-transparent material and the amount of light collected varies depending on the position of the semi-transparent material and the thickness of the semi-transparent material at that position. In other words, the relative position of the semi-transparent material will control how much light passes from the IR-LED to the phototransistor and how much light scatters through the material. The thicker the semi-transparent material, the more light that is scattered or blocked by the semi-transparent material and the less light that is collected by the phototransistor. Similarly, the thinner the semi-transparent material, the less light that is scattered or blocked and the more light that is collected by the phototransistor. Based on the varying output voltage, and through the use of coupled electronic circuitry, a linear or rotary analog position sensor is provided by the invention. The specific components, structure, and configuration of preferred embodiments of the invention are discussed below.

Figure 3:
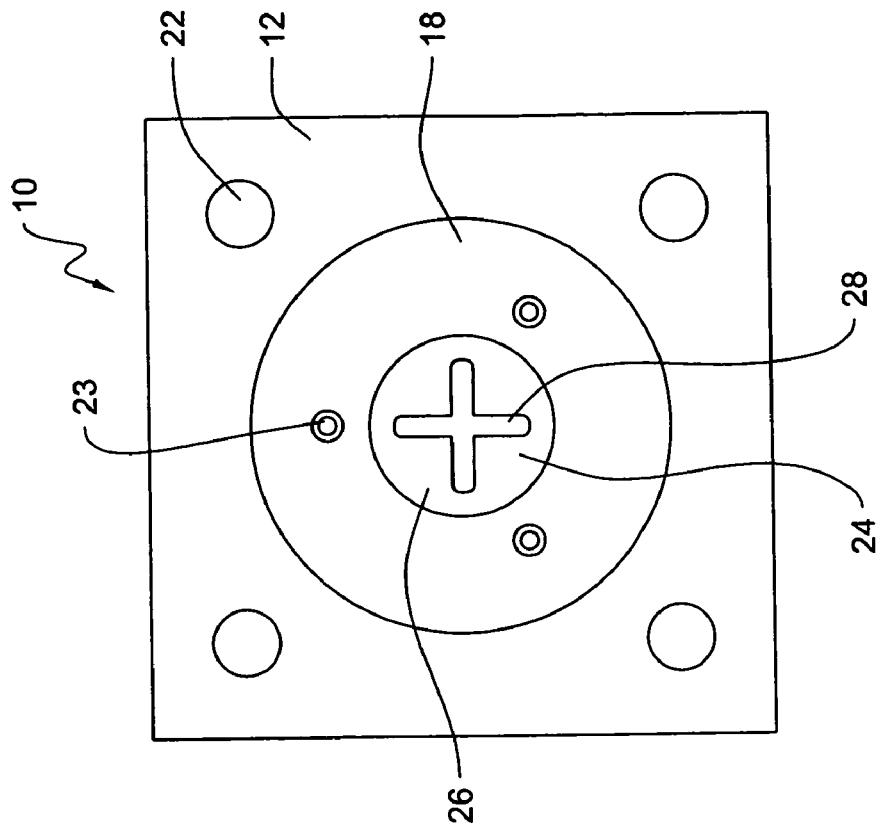
FIG. 3 is a bottom view of the invention of FIG. 1.
Figure 2:
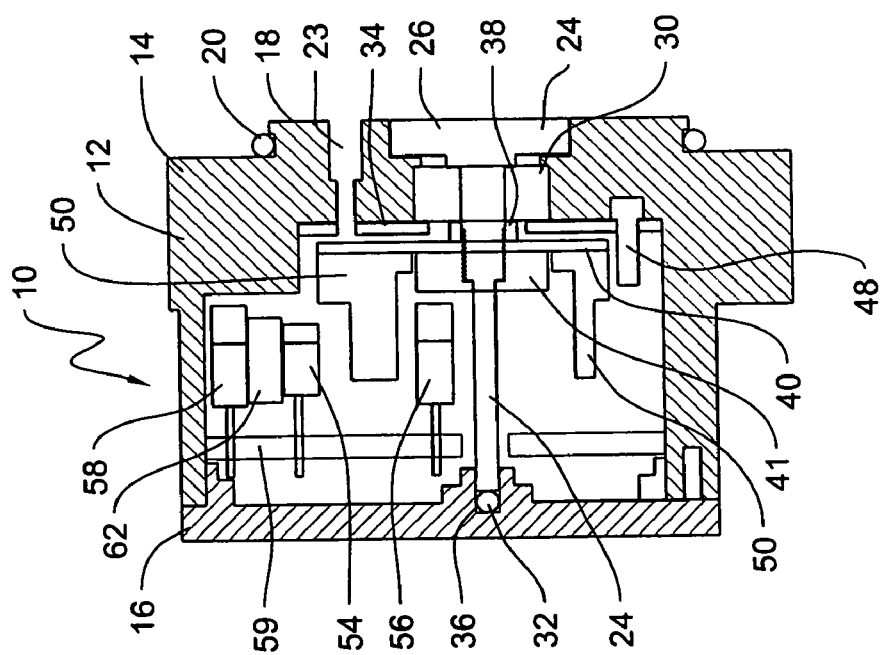
FIG. 2 is a cross-section view of the invention of FIG. 1 taken at line 2—2.

Specifically, and referring to FIGS. 1–3, there is depicted an exemplary embodiment of the sensor device of the present invention. The exemplary sensor device 10 is an analog position sensor that may be used for numerous applications and coupled to controller components, such as, by way of example, joystick controls for earth moving equipment, vehicle throttle controls, accelerator devices, and the like. The sensor 10 will detect the movement of the controller or similar device and determine the position of the controller. While a position sensor is depicted in the Figures, one skilled in the art will understand that the teachings and principles of the invention set forth herein may be used with other types of sensors or for other applications.

The sensor 10 includes a housing 12 that is sized and configured to enclose the working components of the sensor 10. The housing 12 may be made of any suitable durable material such as nylon, plastic or other acceptable material, and may be molded into different shapes and configurations depending on the application. As shown by FIG. 2, the housing 12 includes a housing body 14 for containing the components of the sensor 10, and a housing cover 16 for enclosing the housed sensor components. The housing cover 16 may be fastened or secured to the housing body 14 through conventional fastening or securing techniques. The housing body 14 defines a mounting surface 18 to permit the mounting of the housing 12 to other components and structures. An o-ring 20 may be positioned on the mounting surface 18 to seal the housing 12 to other components, thereby creating a sealed engagement between the housing 12 and the other components. The housing body 14 may include mounting holes 22, 23 to permit the mounting or attachment of the housing 12 to other components and structures. Such mounting or attachment may be achieved through known mounting or fastening techniques.

The exemplary sensor 10 is a rotary position sensor and includes a rotatable shaft 24 positioned within the housing 12. The rotatable shaft 24 may be made from stainless steel or other suitable material. The rotatable shaft 24 defines at one end a shaft head 26 on which may be mounted, coupled, or attached a controller, actuator, joystick, or the like, not shown. As stated above, numerous types of controllers may be used with the principles and teachings of the invention. The shaft head 26 may include a slotted keyway 28 (FIG. 3) to facilitate the mounting, coupling, or attachment of the controller or similar device to the shaft head 26. By manually operating the controller, for example, by turning or rotating the controller, the coupled shaft 24 will rotate within the housing 12, along with the other components of the sensor 10 that are mounted to the shaft 24, as discussed below. The movement of the shaft 24 and thus the movement of the controller will be detected by the sensor components of the invention, as described below.

Referring to FIG. 2, the shaft 24 is supported in the housing 12 at one end, adjacent to the shaft head 26, by a ball bearing 30 and, at the opposite end, by a single bearing 32, preferably a polymer bearing. The ball bearing 30 is held in place by a bearing retainer 34, while the bearing 32 is positioned within a pocket 36 formed within the housing body 14. One of skill in the art will understand that other bearings and bearing configurations may be used with the invention and still permit the rotational movement of the shaft 24 within the housing 12. A cylindrical spacer 38 is positioned over the shaft 24 and on the inner race of the ball bearing 30.

A stop plate 40 is positioned over the shaft 24 and on the cylindrical spacer 38. With this configuration, the stop plate will be spaced apart from the bearing retainer 34. The stop plate 40 is secured to the shaft 24 through the use of a threaded retaining nut 41 which is threaded onto the shaft 24. Because the stop plate 40 is secured to the shaft 24, the stop plate will rotate with the shaft 24. In use, the stop plate 40 serves as a base or support structure for the semi-transparent material, sometimes referred to herein as an optical member, and also serves to control the degree of rotation of the semi-transparent material, as described below. The stop plate 40 is preferably made from a metallic material or other suitable durable material.

Referring back to FIG. 1, the stop plate 40 is generally circular in shape and defines a peripheral edge 42. A portion of the peripheral edge 42 of the stop plate 40 is removed to form a groove or channel 44 defining opposing groove shoulders or walls 46. Positioned within the housing 12 and between the opposing groove shoulders 46 is a stop pin 48. The stop pin 48 is secured to the housing 12 and serves as a stop to control the degree of rotation of the stop plate 40. In use, as the shaft 24 and accompanying stop plate 40 rotate, the shaft 24 and stop plate 40 will rotate until either of the opposing groove shoulders 46 contacts the stop pin 48 at which point the stop pin 48 prevents further rotation of the shaft 24 and stop plate 40 in that direction. When the shaft 24 and stop plate 40 rotate in the opposite direction, the shaft 24 and stop plate 40 will rotate until the stop pin 48 contacts the other groove shoulder 46, thereby stopping the rotation of the shaft 24 and stop plate 40 in that direction. The degree of rotation of the stop plate 40 is determined by the length of the channel or groove 44 extending along the peripheral edge 42. The longer the groove 44, the greater the degree of possible rotation of the stop plate 40. Likewise, the shorter the groove 44, the shorter the degree of possible stop plate 40 rotation. In an exemplary embodiment, the groove 44 has a length that permits approximately 60 degrees of stop plate 40 rotation. The length of the groove 44 and therefore the degree of stop plate 40 rotation may vary depending on the desired application and it is contemplated that the stop plate 40 rotation may have a rotation range of 20 to 120 degrees. However, it is also possible that the degree of stop plate 40 rotation may fall outside of the aforementioned rotation range. In other words, the present invention is not limited in the possible range of stop plate 40 rotation.

Referring to FIGS. 1 and 2, an optical member, such as an optical cam 50, is mounted to the stop plate 40. The optical cam 50 is semi-transparent and made, according to one embodiment of the invention, from a polyester grade material, such as Valox 325, a translucent polymer known to have good light scattering properties. The optical cam 50, however, may be made from numerous other semi-transparent materials that exhibit suitable light scatter properties. Because the optical cam 50 is mounted to the stop plate 40, the optical cam 50 will rotate with the stop plate 40 and will therefore have the same range of rotation as the stop plate 40 and the shaft 24. Consequently, as the range of permissible rotation of the stop plate 40 changes, so will the range of rotation of the optical cam 50. It is contemplated that the optical cam 50 and stop plate 40 may be combined into a unitary structure.

In the exemplary embodiment depicted in FIG. 1, the optical cam 50 defines a cam-shaped optical cam body that is concentrically positioned on the shaft 24. While the shape, configuration, and thickness of the optical cam 50 may vary, the exemplary optical cam 50 has a thickness that gradually increases. As discussed below, the thickness of the optical cam 50, which is made from a semi-transparent or opaque material, will control the amount of light that transmits from the infrared light emitting diode 54 (IR-LED) to the phototransistor 56, both of which are described below, by scattering or blocking some of the infrared light passing through the optical cam 50. Due to the light scattering properties of the optical cam 50, the amount of infrared light passing through the optical cam 50 and collected by the phototransistor 56 will vary depending on the thickness of the optical cam 50 positioned between the IR-LED 54 and the phototransistor 56. Because the optical cam 50 has a gradually increasing thickness and because the optical cam 50 rotates with the rotation of the shaft 24 and the stop plate 40, the amount of light passing through the optical cam 50 will vary as the optical cam 50 rotates.

Mounted within the housing 12 is the IR-LED 54, the phototransistor or photodiode 56, and a feedback phototransistor or photodiode 58. These components are mounted to the housing 12 through the use of a printed circuit board 59 which is secured to the housing 12. These components are electrically coupled to the printed circuit board 59, as is known in the art. The printed circuit board 59 is electrically coupled, via electric wires 61, to other components, not shown, for further voltage signal processing. Also mounted within the housing 12 and between the IR-LED 54 and feedback phototransistor 58 is an optical gauge 62. As illustrated in FIG. 1, the phototransistor 56, the optical cam 50, the IR-LED 54, the optical gauge 62, and the feedback phototransistor 58 are aligned radially outward from the shaft 24. As stated above and as shown in FIG. 1, the optical cam 50 is located within the housing such that the region on the optical cam 50 having a gradually increasing thickness is positioned between the IR-LED 54 and the phototransistor 56.

As stated above, the amount of light received or collected by the phototransistor 56 will be dependent on the opacity and thickness of the optical cam 50. As the amount of light received by the phototransistor 56 varies as the optical cam 50 rotates, the output voltage from the phototransistor 56 to the printed circuit board 59 will vary as well. The output voltage from the phototransistor 56 will be a function of the position of the optical cam 50. The output voltage will therefore be indicative of the position of the optical cam 50, which is indicative of the position of the controller that is mounted to the rotatable shaft 24. If the thickness of the optical cam 50 increases linearly, as depicted in FIG. 1, the output voltage from the phototransistor 56 will also increase linearly, as the optical cam 50 is rotated through its full range of motion. Similarly, if the thickness of the optical cam 50 increases non-linearly, the output voltage from the phototransistor 56 will also increase non-linearly, as the optical cam 50 is rotated through its full range of motion. The output voltage signal, which is indicative of the position of the controller, is sent to the printed circuit board 59 for further signal processing.

The IR-LED 54 will emit infrared light that will also pass through the optical gauge 62 and be collected by the feedback phototransistor 58. The optical gauge 62 is positioned between the IR-LED 54 and the feedback phototransistor 58. Although not clearly shown, it is noted that an air gap preferably exists between the optical gauge 62 and the phototransistor 58, as well as between the optical gauge 62 and IR-LED 54. The optical gauge 62 and feedback phototransistor 58 collectively serve to detect sensitivity changes in the optical cam 50 and compensate for those changes. The optical gauge 62 is preferably made from the same material as the optical cam 50 and because of its fixed relationship between the IR-LED 54 and feedback phototransistor 58 will permit a predetermined amount of light to transmit through the optical gauge 62. This predetermined amount of infrared light passing through the optical gauge 62 may change over time as a result of extended use of the sensor 10, use in high temperature situations, and time, all of which may change the light-dispersing properties, such as the opacity and the refractive index of the optical gauge 62. The same changes in the light-dispersing properties of the optical gauge 62 will also be experienced by the optical cam 50. The feedback phototransistor 58 will detect the changes in the properties of the optical gauge 62, which, as stated, will be the same changes in the properties of the optical cam 50, and will provide a voltage signal vis-à-vis the printed circuit board 59 that may be used to adjust the level of infrared light emitted by the IR-LED 54, thereby compensating for the changes in properties of the optical cam 50 and the optical gauge 62.

Figure 4:
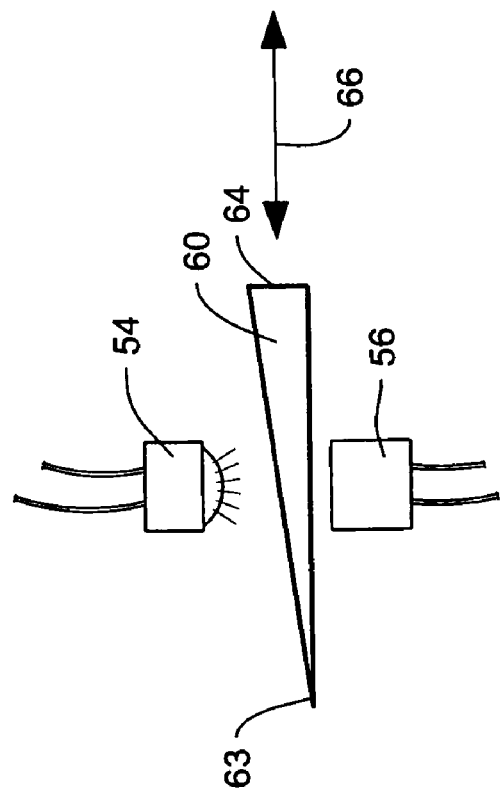
FIG. 4 is a schematic of another exemplary embodiment of a sensor device of the invention.

Referring to FIGS. 4–7, there are depicted in schematic form other exemplary embodiments of the invention. These embodiments may be used with the teachings and principles of the embodiment depicted in FIGS. 1–3. As shown in FIG. 4, the concepts of the invention may be used to create a linear position sensor through the use of a semi-transparent material 60 that is positioned between the IR-LED 54 and the phototransistor 56. The semi-transparent material 60 defines a thickness that has a wedge-shaped profile that increases gradually or linearly from end 63 to end 64. In use, the semi-transparent material 60 may pass between the IR-LED 54 and the phototransistor 56 and, as illustrated by direction arrow 66, may pass between the IR-LED 54 and the phototransistor 56 in either direction. The amount of light collected by the phototransistor 56 will vary depending on the position of the semi-transparent material 60 and the thickness of the material 60 at that position. As with the above embodiment, the output voltage of the phototransistor 56 will therefore vary depending on the amount of light collected by the phototransistor 56.

Figure 5:
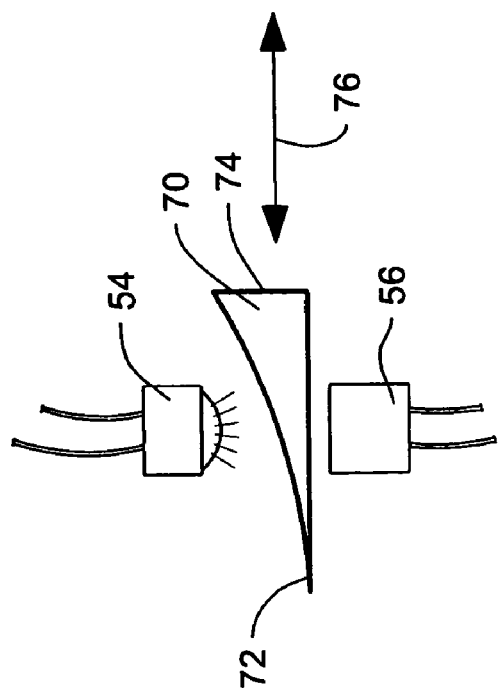
FIG. 5 is a schematic of still another exemplary embodiment of a sensor device of the invention.

As shown in FIG. 5, another exemplary embodiment of a linear sensor of the invention is depicted and includes a semi-transparent material 70 that is positioned between the IR-LED 54 and the phototransistor 56. The semi-transparent material 70 defines a thickness having an exponentially increasing profile. In other words, the thickness at end 72 increases at a smaller rate than at end 74, where the thickness of the semi-transparent material 70 increases at a much larger rate. Again, the semi-transparent material 70 may pass between the IR-LED 54 and the phototransistor 56 in either direction, as illustrated by direction arrow 76, and the amount of light collected by the phototransistor 56 will vary, and consequently the output voltage provided by the phototransistor 56, depending on the position of the semi-transparent material 70 and the thickness of the material 70 at that position.

Figure 6:
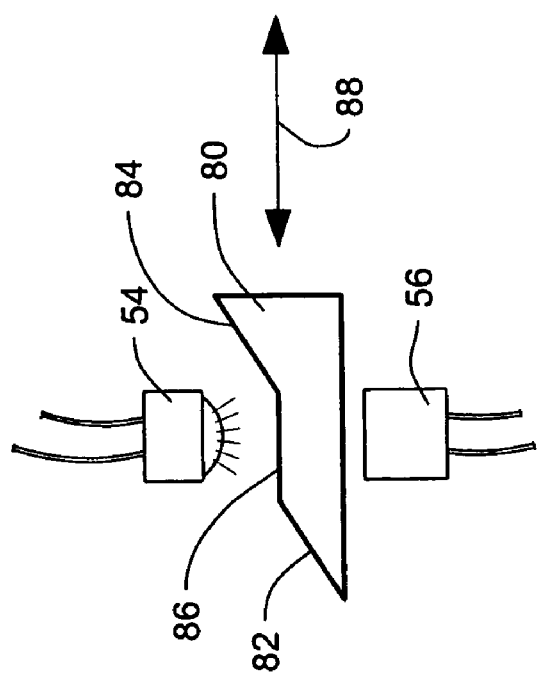
FIG. 6 is a schematic of yet another exemplary embodiment of a sensor device of the invention.

As shown in FIG. 6, another exemplary embodiment of a linear sensor of the invention is depicted and includes a semi-transparent material 80 that is positioned between the IR-LED 54 and the phototransistor 56. The semi-transparent material 80 defines a thickness having profile with multiple inclines 82, 84 positioned on opposing ends of a level or non-inclined middle section 86. With this profile, as the semi-transparent material 80 passes between the IR-LED 54 and the phototransistor 56, in either direction as depicted generally by direction arrow 88, the amount of light collected by the phototransistor 56 will vary depending on the position of the semi-transparent material 80 between the IR-LED 54 and phototransistor 56 and the thickness of the material 80 at that position.

Figure 7:
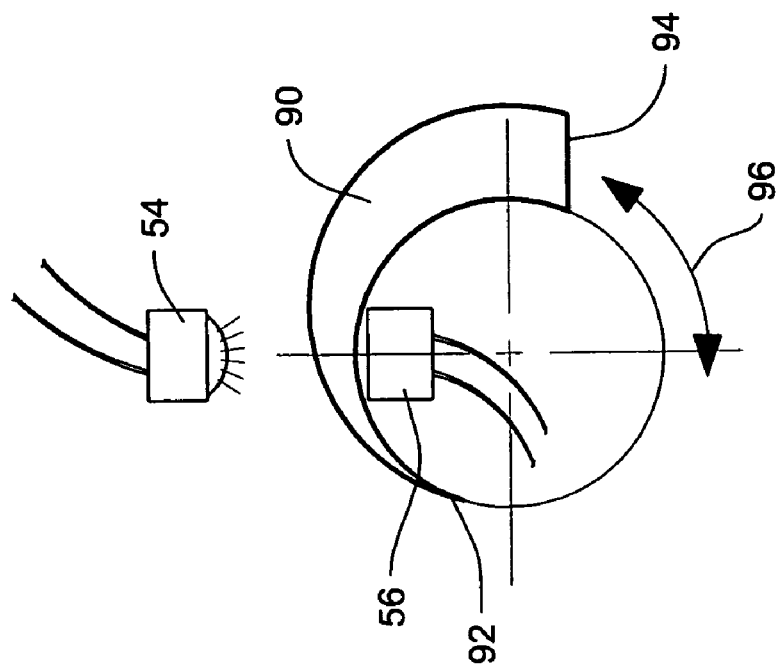
FIG. 7 is a schematic of another exemplary embodiment of a sensor device of the invention.

As shown in FIG. 7, another exemplary embodiment of the invention is depicted as a rotary sensor, similar to the embodiment of FIG. 1. With this embodiment, a semi-transparent material 90 may be positioned between the IR-LED 54 and the phototransistor 56. The semi-transparent material 90 defines a thickness that has a wedge-shaped profile that gradually increases from end 92 to end 94. As should be readily apparent to one skilled in the art, the semi-transparent material 90 may be rotated in either direction, as indicated by direction arrow 96, and the amount of light collected by the phototransistor 56, and resulting output voltage, will vary depending on the rotary position of the semi-transparent material 90 and the thickness of the material 90 at that position.

As should be evident from the aforementioned embodiments, there are numerous possible shapes and configurations of the semi-transparent material that may be used with the present invention Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A position sensor comprising:
   a housing;
   a light emitting device mounted to the housing;
   a light receiving device for collecting light from the light emitting device, the light receiving device configured to transmit an output voltage proportional to the light collected by the light receiving device, the light receiving device spaced apart from the light emitting device and mounted to the housing; and
   a semi-transparent optical member positioned between the light emitting device and the light receiving device to control the amount of light collected by the light receiving device, the optical member having a substantially solid cross-section where light from the light emitting device passes through, the optical member further having a shape that includes a varying thickness, and the optical member being movable between the light emitting device and the light receiving device, wherein light from the light emitting device travels through the optical member and to the light receiving device, such that the amount of light collected by the light receiving device and the output voltage transmitted by the light receiving device varies based on the thickness of the optical member in relation to the optical member's position between the light emitting device and the light reactiving device and the light traveling therethrough.

2. A position sensor comprising:
   a housing;
   a light emitting diode mounted to the housing, the light emitting diode radiating light;
   a light receiving device for collecting the radiated light from the light emitting diode, the light receiving device configured to transmit an output voltage proportional to the light collected by the light receiving device, the light receiving device spaced apart from the light emitting diode and mounted to the housing;
   a semi-transparent optical member positioned between the light emitting diode and the light receiving device to control the amount of light collected by the light receiving device, the optical member having a varying thickness and being movable between the light emitting diode and the light receiving device, the amount of light collected by the light receiving device and the output voltage transmitted by the light receiving device varying based on the thickness of the optical member; and
   a feedback light receiving device mounted to the housing, and a semi-transparent optical gauge positioned between the light emitting diode and the feedback light receiving device.

3. The position sensor as set forth in claim 2, wherein the light emitting diode, the light receiving device, and the feedback light receiving device are coupled to a printed circuit board.

4. The position sensor as set forth in claim 2, wherein the light receiving device is a phototransistor.

5. The position sensor as set forth in claim 2, wherein the feedback light receiving device is a phototransistor.

6. The position sensor as set forth in claim 2, wherein the optical member and the optical gauge are made of the same material.

7. The position sensor as set forth in claim 1, wherein the optical member is rotatable around the light receiving device.

8. The position sensor as set forth in claim 7, wherein the optical member is an optical cam.

9. The position sensor as set forth in claim 7, wherein the optical member defines a thickness that gradually increases.

10. The position sensor as set forth in claim 7, wherein the optical member is mountable to a stop plate that controls the degree of rotation of the optical member.

11. The position sensor as set forth in claim 1, wherein the optical member moves linearly between the light emitting diode and the light receiving device.

12. The position sensor as set forth in claim 11, wherein the optical member defines a thickness that gradually increases.

13. The position sensor as set forth in claim 11, wherein the optical member defines a thickness that increases exponentially.

14. The position sensor as set forth in claim 1, wherein the light emitting diode radiates infrared light.

15. A position sensor comprising:
   a housing;
   a light emitting diode mounted to the housing, the light emitting diode radiating light;
   a light receiving device for collecting the radiated light from the light emitting diode, the light receiving device configured to transmit an output voltage proportional to the light collected by the light receiving device, the light receiving device spaced apart from the light emitting diode and mounted to the housing; and
   a semi-transparent optical member positioned between the light emitting diode and the light receiving device to control the amount of light collected by the light receiving device, the optical member having a substantially solid cross-section where light from the light emitting diode passes through, the optical member being rotatable around the light receiving device, the optical member having a shape that includes a varying thickness, and the optical member being movable between the light emitting diode and the light receiving device, wherein light from the light emitting diode travels through the optical member and to the light receiving device, such that the amount of light collected by the light receiving device and the output voltage transmitted by the light receiving device varies based on the thickness of the optical member in relation to the optical member's position between the light emitting diode and the light receiving device and the light traveling therethrough.

16. A position sensor comprising:

a housing;

a light emitting diode mounted to the housing, the light emitting diode radiating light;

a light receiving device for collecting the radiated light from the light emitting diode, the light receiving device configured to transmit an output voltage proportional to the light collected by the light receiving device, the light receiving device spaced apart from the light emitting diode and mounted to the housing;

a semi-transparent optical member positioned between the light emitting diode and the light receiving device to control the amount of light collected by the light receiving device, the optical member rotatable around the light receiving device, the optical member having a varying thickness and being movable between the light emitting diode and the light receiving device, the amount of light collected by the light receiving device and the output voltage transmitted by the light receiving device varying based on the thickness of the optical member; and a feedback light receiving device mounted to the housing, and a semi-transparent optical gauge positioned between the light emitting diode and the feedback light receiving device.

17. The position sensor as set forth in claim 16, wherein the light receiving device and the feedback light receiving device are phototransistors.

18. The position sensor as set forth in claim 17, wherein the optical member is an optical cam having a gradually increasing thickness, and wherein the optical cam is mountable to a stop plate that controls the degree of rotation of the optical cam.

19. The position sensor as set forth in claim 15, wherein the light emitting diode radiates infrared light.

20. A position sensor comprising:

a housing;

a light emitting diode mounted to the housing, the light emitting diode radiating infrared light;

a light receiving device for collecting the radiated infrared light from the light emitting diode, the light receiving device configured to transmit an output voltage proportional to the light collected by the light receiving device, the light receiving device spaced apart from the light emitting diode and mounted to the housing;

a semi-transparent optical member positioned between the light emitting diode and the light receiving device to control the amount of infrared light collected by the light receiving device, the optical member rotatable around the light receiving device, the optical member having a shape that includes a varying thickness and being movable between the light emitting diode and the light receiving device, the amount of light collected by the light receiving device and the output voltage transmitted by the light receiving device varying based on the thickness of the optical member;

a feedback light receiving device mounted to the housing; and a semi-transparent optical gauge positioned between the light emitting diode and the feedback light receiving device.

21. The position sensor as set forth in claim 20, wherein the light receiving device and the feedback light receiving device are phototransistors.

22. The position sensor as set forth in claim 21, wherein the optical member is an optical cam having a gradually increasing thickness, and wherein the optical cam is mountable to a stop plate that controls the degree of rotation of the optical cam.

* * * * *